United States Patent [19]
Morand

[11] 3,852,747
[45] Dec. 3, 1974

[54] DEVICE FOR NEUTRALIZING A FIRE-CONTROL RADAR

[75] Inventor: Jean Francois Morand, Paris, France

[73] Assignee: Electronique Marcel Dassault, Paris, France

[22] Filed: Sept. 14, 1972

[21] Appl. No.: 289,135

[30] Foreign Application Priority Data
Sept. 24, 1971  France .............................. 71.34375

[52] U.S. Cl. ................................ 343/18 E, 343/7.5
[51] Int. Cl. ........................... H04k 3/00, G01s 7/42
[58] Field of Search .......... 343/18 E, 18 R, 7 A, 7.5

[56] References Cited
UNITED STATES PATENTS
2,960,664  11/1960  Brodwin ............................ 343/18 E
2,989,744   6/1961  Pettit ................................. 343/18 E
3,604,828   9/1971  Perkovich ............................ 35/10.4
3,699,575  10/1972  Peter, Jr. et al. ................. 343/18 E Primary Examiner—Maynard R. Wilbur
Assistant Examiner—G. E. Montone
Attorney, Agent, or Firm—Bacon & Thomas

[57] ABSTRACT

A device for neutralizing a fire-control radar used in the fire control of guns, machine guns, missiles and the like. The device comprises an antenna for reception of radar signals connected to a receiver, at least one transmission antenna for emitting radio-wave signals, and means between the output of said receiver and said transmission antenna to provide jamming radio-wave signals including a spectrum of noise and a sequence of false echoes.

13 Claims, 4 Drawing Figures

DEVICE FOR NEUTRALIZING A FIRE-CONTROL RADAR

The invention relates to a device for neutralizing a radar used in the fire-control of guns, machine guns, missiles or the like (and called hereafter a fire-control radar).

It is known that fire-control apparatuses, as well as certain apparatuses for automatically guiding missiles or self-guiding apparatuses, comprise a radar which generates and delivers the firing instructions from the echo returned from a target.

The target is frequently an aircraft and it has been proposed to equip this aircraft with a transmitting and receiving device which, when it receives radiation from a radar system transmits a jamming radiation intended to disturb the operation of this system.

A jamming device of a first type emits a noise spectrum of sufficient amplitude for an enemy radar receiver to be unable to distinguish the reflected echo from the noise. In this case, however, the receiver of the enemy radar may still provide goniometrical information so that, although the gunfire control, for which range and speed data are required, is rendered impossible for this radar, the same does not apply to the firing of missiles which can still be guided towards the target.

A jamming device of a second type, as soon as radar radiation is received, emits a succession of jamming signals consistent with echoes similar to those returned from the aircraft receiving the radiation and acting as a target, so that the tracking radar receives not only the target echo but also a sequence of echoes, rendering it impossible for the tracking radar to prepare the tracking of the target. There again, the goniometrical information is not suppressed. Furthermore, the addition to the tracking radar of means for detection of the first echo only out of the sequence of echoes received is an effective way to avoid the jamming.

The transmission by the jamming device of fictitious echoes of large amplitude may, nevertheless, render it impossible for the tracking radar to select the first echo only, but the energy required for the transmission of these high-intensity echoes limits the use of such jamming devices.

It is a main object of the present invention to provide a device for the neutralization of a fire-control radar having a greater efficiency than that of the known devices and being simple and economical in construction.

The present invention provides a device for neutralizing a fire-control radar and comprising means for providing an interference comprising a noise spectrum and false echoes.

Preferably said means comprises a noise amplifier with which a modulator is associated to generate said echoes from the noise signal. The device may also comprise a receiver and means for blocking its operation by means of the output of the modulator. Preferably the amplifier is adjusted through the comparison between the received pulse and the output signal of the amplifier.

Preferably two separate antennas are provided for transmitting the noise signal and the false echoes.

Preferably the antenna for transmitting the false echoes is connected to the output of a first amplifier, or echo amplifier, to the input of which is applied a noise signal obtained by coupling to the output of the noise amplifier, the echo amplifier being modulated by a sequencer. The device may also comprise a receiver and means for blocking the receiver, said means being controlled by the output of the modulator.

Not only does the tracking radar become ineffective for distinguishing between the real echo and the false echoes, but further the impossibility of this selection maintains the false echoes fully operational, giving the pursuer's radar false range data which may vary very rapidly, so that said radar can never reach the tracking condition and thus supply goniometrical information.

A neutralization device according to the invention therefore has increased effectiveness, preventing the pursuing aircraft from using its radar system for gunfire control and for missile fire-control as well.

The present invention further provides a stream-lined body comprising a device as set forth in the last preceding paragraph but four.

Preferably said body is provided with a receiving antenna, the noise transmitting antenna and the false echoes transmitting antenna.

Preferably the receiving antenna and the noise transmitting antenna are disposed one at each side of the central longitudinal axis of the stream-lined body and the antenna for transmitting false echoes is provided at the nose of the stream-lined body, on its longitudinal axis.

In the following description, given by way of example, reference is made to the accompanying drawing in which.

Figure 1:
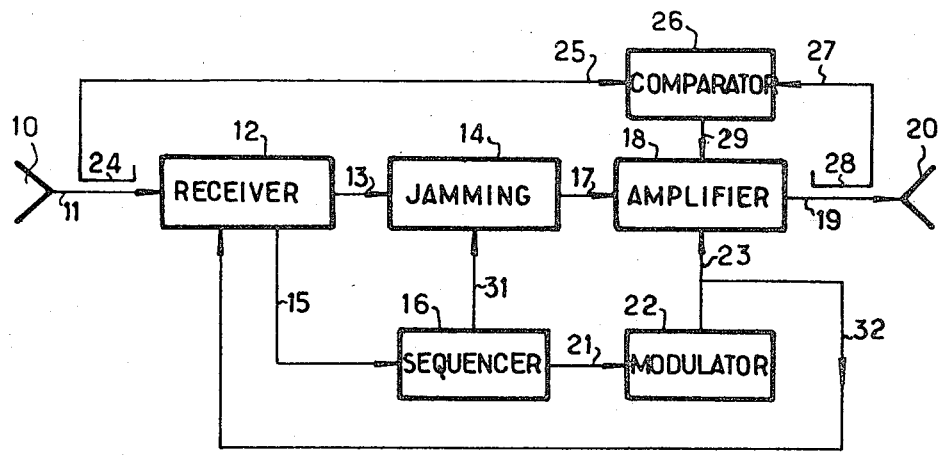
FIG. 1 is a block diagram of a device according to the invention.

The neutralization device shown in FIG. 1 comprises an antenna 10 adapted to pick up radar transmissions, the antenna being connected by an input line 11 to a receiver 12, a first output 13 of which is connected to a jamming source 14, provided by a noise generator, and a second output 15 of which is connected to a sequencer 16, which is a device adapted to introduce a sequence in accordance with a predetermided law, and which moreover, is adjustable both in time and in its effects. The law is a function of the mission, i.e., of the expected kind of tracking. An output 17 of the jamming source 14 is connected to an amplifier 18, an output line 19 of which is connected to a transmission antenna 20. The sequencer 16 is connected by a line 21 to a modulator 22, an output 23 of which controls the amplification introduced by the amplifier 18. The sequencer is also connected by a line 31 to the jamming source 14. A second output of the modulator 22 is connected to the receiver 12 by a line 32.

A coupling device 24 at the input line 11 of the receiver 12 is connected to a first input 25 of a comparison device 26, a second input 27 of which is connected to a coupling device 28 co-operating with the output line 19 of the amplifier 18. The result of the comparison is applied by a line 29 to regulate the level of the amplifier 18.

Figure 2:
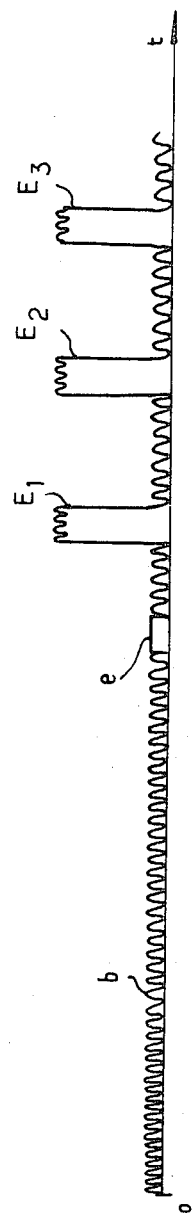
FIG. 2 is a signal diagram.

The operation of the neutralization device is as follows:

When an enemy radar pulse is received at a frequency at which the receiver 12 is set up in advance, the jamming source 14 is rendered operational and emits a noise signal, as shown diagrammatically at *b* on the diagram in FIG. 2 representing the input signal at the fire-control radar which transmitted the pulse that caused the intervention of the neutralization device according to the invention. Said pulse is entered at *o* on this diagram. Through means of analysis provided in the receiver 12, the amplitude of the noise signal radiated by the antenna 20 is such that the noise signal received at the receiver of, for example, an enemy aircraft has an amplitude slightly greater than or of the same order of magnitude as that of a radar echo *e* which would be received at the fire-control radar of the enemy aircraft without the intervention of the neutralization device according to the invention.

Furthermore, through the channel 15, the reception of the pulse has set in operation the sequencer 16 which intervenes, either by means of the modulator 22 and the amplifier 18, or directly through the channel 31, at the jamming source 14, to increase the amplitude of the noise signal radiated by the antenna 20 in accordance with a law that materializes, at the fire-control radar to be neutralized, through the appearance of false echoes E1, E2, E3...

The jamming transmission ceases as soon as the reception of the enemy radar signal ceases.

The masking of the real echo *e* by the noise prevents an enemy fire-control device from preparing to pursue the echo *e*. Its telemetering window or windows will lock onto the false echoes such as E1, E2 or E3...

In a device according to the invention the sequencer 16 comprises means whereby the jamming source 14 transmits false echoes, the amplitudes and the correlation of which are such that, received at the enemy fire-control radar, they will, after a certain time, cause such a rapid variation in telemetric distance to appear that at no time can the telemetering window of the fire-control radar remain locked-on, so that at no time can the radar pass from the search condition to the tracking condition.

Thus, not only the range data, and consequently the speed data, cannot be obtained, so that gunfire control is impossible, but also accurate goniometric information cannot be obtained either, because the radar will never assume its tracking condition and firing will be rendered ineffective.

The intervention of the comparator 26 enables the level of the noise signal *b* to be adequately and without excess maintained at the appropriate value. The passage of the fire-control apparatus into a passive condition of operation on the noise signal is prevented.

By means of the line 32 placed in between the line 23 and the receiver 12, the operation of the receiver 12 is blocked during the transmission of the false echoes, thus avoiding the necessity for very strong decoupling between the antennas 10 and 20.

Thus the antennas 10 and 20 can be located relatively close to one another and the device can be used on aircraft or relatively small dimensions without the necessity to provide special decoupling means.

Figure 3:
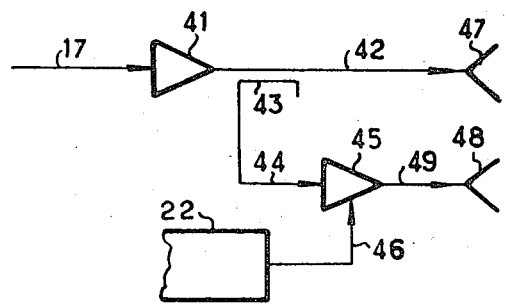
FIG. 3 is a diagram relating to a modification.

In the embodiment shown in FIG. 3, the channel 17 that is the output of the jamming source 14 is connected to a first amplifier 41 and the output 42 of the latter comprises a coupling device 43 connected to the input 44 of a second amplifier 45, the amplification of which is controlled by the input 46 coming from the modulator 22. The noise signal is then transmitted by a first antenna 47 connected to the output 42 of the first amplifier 41, while the false echoes are transmitted by a second antenna 48 connected to the output 49 of the second amplifier 45 which is appreciably more powerful with respect to the peak value of the amplitude than the amplifier 41. This arrangement does not, however, offer any disadvantage as regards power consumption because it operates when transmitting false echoes only, hence at a reduced working load.

The distribution of the transmission between two antennas may facilitate their location on an aircraft equipped with a neutralization device according to the invention.

Figure 4:
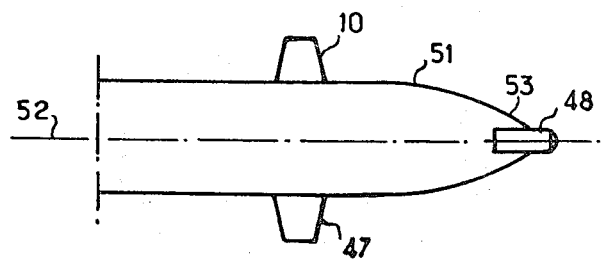
FIG. 4 is a diagrammatic view of a stream-lined body equipped with antennas.

In FIG. 4, for example, a stream-lined body 51 is shown comprising, on one side of its central longitudinal axis 52, a receiving antenna 10 and on the other side a transmission antenna 47, the latter being provided for the transmission of the noise signal, and at its front tip 53, an antenna 48 for the transmission of false echoes. The stream-lined body 51 may be adapted to be suspended to an aircraft. It may also be the actual fuselage of the aircraft.

In both embodiments, the construction of the device is particularly simple because of the devices which are common to the transmission of the noise signal and of the false echoes.

The energy efficiency is high, the maximum power being supplied during the periods of existence of the false echoes only.

Operation is discreet, jamming being generated as long as the reception of the enemy radar lasts only.

The programming and automation of operations are easy.

I claim:

1. A radar jamming device for jamming fire control radar searching for a target comprising:
    means for receiving radar signals from a fire control radar,
    noise generating means,
    means for initiating said noise generating means upon receipt of said radar signals from said fire control radar,
    means for transmitting said noise signals from said noise generating means,
    means for comparing the amplitude of said transmitted noise signals with said received radar signals,
    first means for controlling the amplitude of said transmitted noise signals in response to said comparing means for providing transmitted noise signals of approximately the same amplitude of said received radar signals,
    second means for controlling the amplitude of said transmitted noise signals for producing pulse signals having an amplitude larger than said transmitted noise signals, said pulse signals superimposed on said noise signals, and
    means for controlling the sequence of said pulse signals to produce false echoes at said fire control radar,
    whereby said false echoes produce a rapid variation in the telemetric target distance and prevent radar tracking.

2. A radar jamming device as recited in claim 1 comprising means to block said receiving means during transmission of said pulse signals.

3. A radar jamming device for neutralizing a fire control radar searching for a target comprising:

receiving antenna means, a receiver coupled to said receiving antenna means for reception of incoming radar signals transmitted from said fire control radar, a noise generator activated by said receiver for generating noise signals, transmitting antenna means, variable gain amplifying means for amplifying said noise signals, said variable gain amplifying means connected to said transmitting antenna means for transmitting output signals, and means controlling the gain of said variable gain amplifying means for providing noise signals of amplitude substantially equal to a real echo signal received by said fire control radar and for simultaneously providing pulse signals having a magnitude greater than said noise signals for simulating false echoes.

4. A radar jamming device as recited in claim 3 wherein said gain controlling means for providing said noise signals comprises:

a first coupling device for providing first signals responsive to the amplitude of the incoming radar signals, a second coupling device for providing second signals responsive to the amplitude of the output signals, and means for comparing said first and second signals for controlling said variable gain amplifying means.

5. A radar jamming device as recited in claim 4 wherein said gain controlling means for providing said pulse signals comprises:

a sequencer having an input connected to said receiver and an output operatively connected to said variable gain amplifying means for controlling the amplitude and time sequence of said noise signals to produce said pulse signals.

6. A radar jamming device as recited in claim 5 further comprising a modulator connected between said sequencer and said variable gain amplifying means.

7. A radar jamming device as recited in claim 6 wherein said receiver has a blocking input terminal and wherein said modulator in connected to said blocking input terminal of said receiver for blocking said receiver during transmission of said pulse signals.

8. A radar jamming device as recited in claim 6 wherein said variable gain amplifying means comprises:

a first amplifier connected to receive said noise signals from said noise generator, and a second amplifier connected to said modulator, and wherein said transmitting antenna means comprises:

a first transmitter connected to said first amplifier for transmitting said noise signals, and a second transmitter connected to said second amplifier for transmitting said pulse signals.

9. A radar jamming device as recited in claim 8 wherein said first transmitting antenna and said receiving antenna means are positioned on opposite sides of a stream-lined airborne body, and said second transmitting antenna is positioned in a forward portion of said body along a longitudinal axis of said body.

10. A radar jamming device as recited in claim 3 wherein said gain controlling means for providing said pulse signals comprises:

a sequencer having an input connected to said receiver and an output operatively connected to said variable gain amplifying means for controlling the amplitude and time sequence of said noise signals to produce said pulse signals.

11. A radar jamming device as recited in claim 10 wherein said sequence is connected to said noise generator for controlling the time-elevation of said noise signals.

12. A radar jamming device as recited in claim 3 further comprising means for blocking said receiver during the transmission of said pulse signals.

13. A radar jamming device as recited in claim 12 wherein said transmitting and receiving antenna means are located close to one another.

* * * * *